(No Model.)
W. C. HARLEY.
SKID.
No. 276,685.　　　　　　　Patented May 1, 1883.
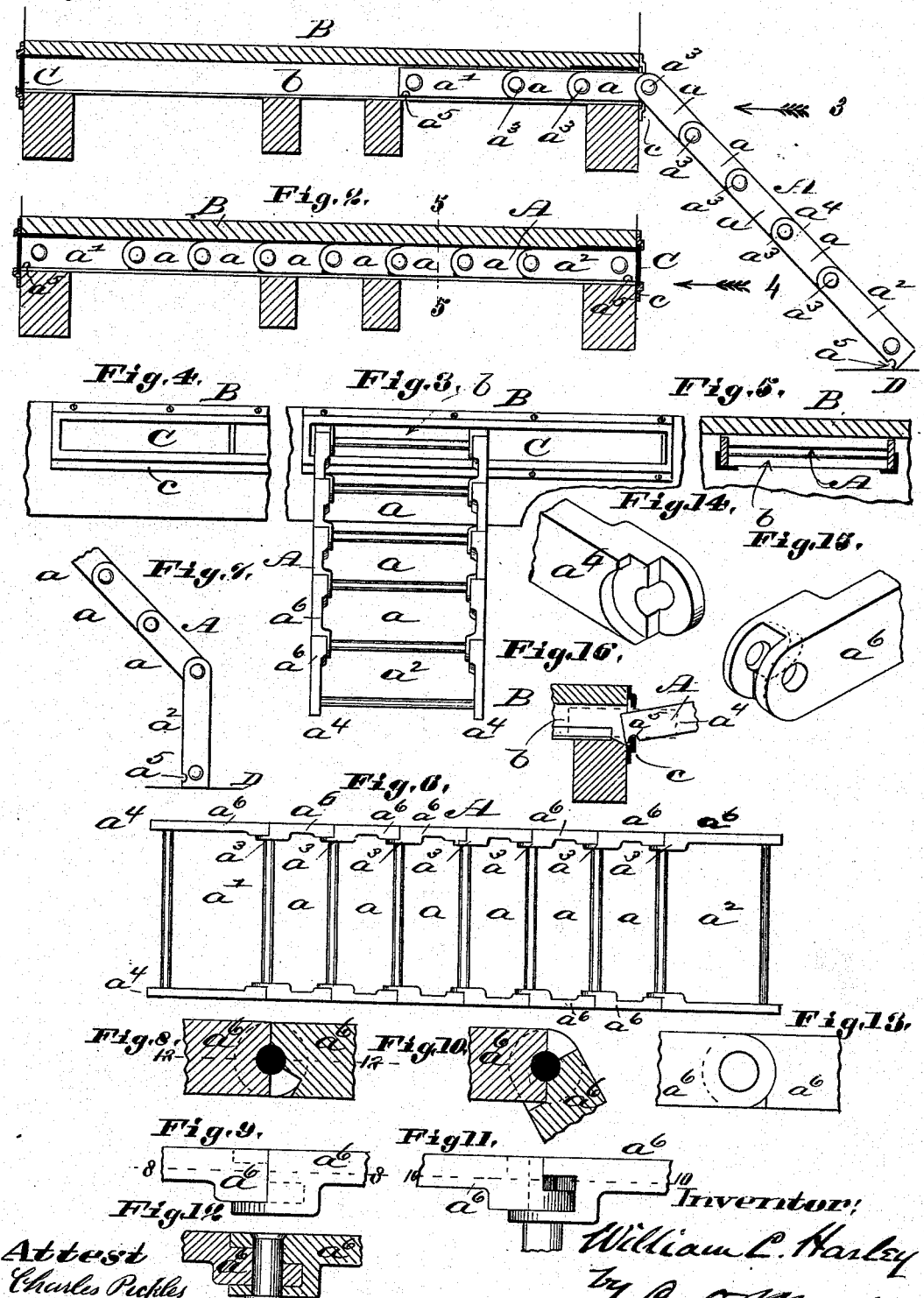

UNITED STATES PATENT OFFICE.

WILLIAM C. HARLEY, OF ST. LOUIS, MISSOURI.

SKID.

SPECIFICATION forming part of Letters Patent No. 276,685, dated May 1, 1883.

Application filed February 5, 1883. (No model.)

To all whom it may concern:

Be it known that I, WILLIAM C. HARLEY, of St. Louis, Missouri, have made a new and useful Improvement in Skids, of which the following is a full, clear, and exact description, reference being had to the accompanying drawings, making part of this specification, in which—

Figure 1 is a side elevation of the improved skid and the construction with which the skid is connected, said construction being shown in vertical section; Fig. 2, a view similar to that of Fig. 1, the skid being shown closed; Fig. 3, a view of the parts as shown in Fig. 1, the view being in the direction of the arrow 3 of Fig. 1; Fig. 4, a view of the parts as shown in Fig. 2, the view being in the direction of the arrow 4 of Fig. 2; Fig. 5, a section on the line 5 5 of Fig. 2; Fig. 6, a plan of the skid; Fig. 7, a side elevation, showing the outer end of the skid, the extreme end of the skid being turned down to form a leg; Fig. 8, a vertical section on the line 8 8 of Fig. 9; Fig. 9, a plan of the joint as shown in Fig. 8; Fig. 10, a vertical section on the line 10 10 of Fig. 11; Fig. 11, a plan of the joint as shown in Fig. 10; Fig. 12, a horizontal section taken on the line 12 12 of Fig. 8; Fig. 13, a side view of one of the skid-joints; Figs. 14 and 15, views in perspective showing bottom upward respectively the two parts of a joint, and Fig. 16 a sectional detail.

The same letters of reference denote the same parts.

The present invention can be used in many places; but it is especially useful in connection with constructions such as railway-cars, platforms, wagons, and trucks.

A represents the improved skid.

B, Figs. 1, 2, 3, 4, 5, represents the floor of a freight or baggage car, the bed or bottom of a wagon or truck, or a platform-top, the improvement being adaptable to any of these constructions. The floor or platform B is of the usual form, saving that it has a recess, $b$, adapted to receive the skid A, which, when not in use, is closed into the recess $b$, as seen in Fig. 2, and when used is drawn out therefrom, as shown in Figs. 1, 3. When the skid is shoved into the recess it may be confined therein by some suitable means, such as the slide C, Figs. 2, 3, 4. This is desirable, more especially when the skid is used in connection with movable constructions, such as cars and wagons.

An additional feature of the improvement is making the skid so that its outer end can be, when the skid is in use, supported at various levels. To this end the skid is made in sections $a$ $a$ $a$ $a'$ $a^2$, jointed together at $a^3$ $a^3$. This enables the skid, when used in connection with a car-floor, A, and drawn out therefrom, as in Figs. 1, 3, to be turned down so that the outer end of the skid can rest upon the ground D or upon a wagon alongside the car, or upon any bearing onto which it is desired to deposit the merchandise or freight delivered from the car.

The inner end of the skid is so made as to have a jointed connection with the car-floor when the skid is drawn out, to enable the skid to be turned, as described. This can be accomplished by allowing some of the sections, $a'$ $a$, to remain in the recess, as shown in Fig. 1; or the skid at its inner end may be provided with hooks, which, when the skid is drawn out, engage with and turn upon lugs or bearings attached to the platform at or near the entrance to the recess $b$. One mode of thus joining the skid to the platform is shown in Fig. 16. The side bars, $a^4$ $a^4$, of the skid are notched at $a^5$ $a^5$, and the flange $c$ (which is attached to the platform and serves as a support for the slide C) engages in the notches when the skid is drawn out. The entire skid then, whether made in one piece or in sections jointed together, can turn either upward or downward upon the flange $c$. The entrance to the recess $b$ is suitably shaped, substantially as shown in Fig. 16, to enable the skid to drop down and bring the notches $a^5$ $a^5$ and flange $c$ into engagement. The mouth of the recess may also be flared laterally to enable the skid to be swung laterally to a limited extent, and in some forms of platforms the skid may be made to swing laterally to any desirable degree. The outer end section, $a^2$, may be turned directly down and made to serve as a leg, as shown in Fig. 7.

In a car or wagon or truck it is desirable to use the skid on either side of the car, &c.

Therefore the recess b is continued entirely across the car, wagon, or truck floor, as shown in Figs. 1, 2, and the skid can be drawn out from either end of the recess b. The various sections $a'$ $a$ $a^2$ can turn but one way—i. e., downward—upon each other. To this end sections $a^6$ of the bars $a^4 a^4$ may be made, as shown in Figs. 8, 10, 9, 11, 12, 14, 15, the construction being analogous to a rule-joint.

I claim—

1. A railway-car, wagon, truck, or platform having a skid adapted to be closed over, into, or beneath the floor of the car, wagon, truck, or platform and withdrawn therefrom, for the purpose described.

2. A railway-car, wagon, truck, or platform having a skid adapted to be closed over, into, or beneath the floor of the car, wagon, truck, or platform and withdrawn therefrom, and when withdrawn therefrom having a jointed connection with the car, wagon, truck, or platform to enable the skid to be inclined as desired.

3. A railway-car, wagon, truck, or platform having a recess, b, to receive a movable skid.

4. The combination of a floor, B, having a recess, b, and a skid, A.

5. A railway-car having a skid adapted to be closed transversely into or beneath the floor of the car and withdrawn therefrom, substantially as described.

6. The combination of the platform B, having the recess b and the jointed skid A.

7. The combination of the platform B, having the recess b, the skid A, and the confining part C, substantially as described.

8. The combination of the platform B, having the recess b, the flange $b'$, and the skid A, said flange and skid being relatively so constructed as to enable, when the skid is drawn out, the inner end of the skid to engage with the flange and thereby prevent the skid from being detached from the platform.

9. The combination of the platform B, the flange c, and the skid A, the bars $a^4$ of which have the notches $a^5$, substantially as described.

10. A railway-car, wagon, or other platform, B, having a recess, b, said recess extending across the platform to enable the skid to be used on either side of the platform.

WILLIAM C. HARLEY.

Witnesses:
C. D. MOODY,
CHARLES PICKLES.